Patented Feb. 9, 1943

2,310,425

UNITED STATES PATENT OFFICE 2,310,425

LUMINESCENT PRODUCT AND METHOD OF PRODUCING THE SAME

Mac Goodman, New York, N. Y.

No Drawing. Application December 3, 1941, Serial No. 421,489

12 Claims. (Cl. 250—81)

This invention relates to luminescent compositions and methods of producing the same, being particularly directed to fluorescent and phosphorescent zinc sulphide end products, this application being a continuation-in-part of my previous application Serial Number 336,881, filed May 23, 1940.

Broadly, it is an object of this invention to produce by ignition a luminescent zinc sulphide which may be fluorescent or phosphorescent, as desired, during the chemical formation of which, at the temperature of ignition, there are physically occluded, in the form of solid solution, within the lattice structure of the zinc sulphide crystals, zinc oxide and activator in the form of a heavy metal or one of its compounds.

Generally, an object of this invention is to cause the chemical formation of luminescent zinc sulphide crystals, through the process of igniting a mixture of zinc oxide and sulphur in substantially stoichiometric proportions, in the presence of traces of heavy metals or their compounds serving as activators, and in the presence or absence of fluxes, so that as crystals of zinc sulphide are progressively formed through chemical reaction, there are physically occluded in solid solution in the lattices of such crystals, minute quantities of zinc oxide and the heavy metal activator, thereby forming as an end product a luminescent zinc sulphide crystal of relatively small size and high emissive properties.

In forming my luminescent zinc sulphide end product aforesaid, I may apply several procedural embodiments, as for example:

I may introduce into the zinc oxide relatively minute quantities of a heavy metal compound as activator, such as copper chloride, heat to a temperature sufficient to form a complex comprising zinc oxide having adsorbed or occluded therein the activator, thereafter grind the intermediate product with elemental sulphur, and ignite at high temperatures: or, I may mix with the zinc oxide and activator of the preceding embodiment a small quantity of fluxes, as an alkali or alkaline earth compound, or an acid or mixture of acids, capable of reacting with the zinc oxide to form a zinc salt, and ignite this mixture to form an intermediate zinc oxide complex, and thereafter grind this intermediate product with elemental sulphur and ignite at elevated temperatures: or, I may mix zinc oxide and sulphur together with traces of a heavy metal or its compound, and a flux or an acid capable of reacting with the zinc oxide to form a zinc salt, and ignite at elevated temperatures.

In each of the above embodiments, the essence of my invention lies in the simultaneous formation of a crystalline zinc sulphide, progressively formed by the chemical intercombination of zinc oxide and sulphur, at the temperature of ignition, and occlusion within the lattices of the crystal, of zinc oxide and activator in solid solution as the chemical reaction progresses.

The end product of this invention, consisting of a luminescent zinc sulphide crystal containing occluded zinc oxide and activator may be arrived at in a further embodiment of this invention as follows:

I may ignite a mixture of zinc oxide and sulphur to form a luminescent zinc sulphide incorporating in its crystal lattices physically occluded zinc oxide in solid solution, in the manner outlined in my application Serial Number 336,881, add thereto a heavy metal or its compound, in the presence or absence of a flux, and thereafter ignite at elevated temperatures.

These and other advantages, capabilities and features of the invention will appear from the subjoined detailed description of one specific embodiment thereof.

As instances of the application of the respective embodiments above outlined, I may proceed as follows:

In the first embodiment I mix 162.8 grams of zinc oxide with a solution of copper chloride containing .018 gram of copper calculated as metal. The mix is thoroughly stirred until all of the zinc oxide is wetted through by the copper chloride solution, dried, ignited for about thirty to forty-five minutes at temperatures between 700° C. and 1000° C. to form as an intermediate product a complex comprising zinc oxide crystal having the activator occluded therein in solid solution. I then cool and grind this intermediate product, and after mixing with 96 to 112 grams of finely powdered elemental sulphur ignite to temperatures between 1000° C. to 1350° C. for periods varying between one-quarter of an hour to two hours, dependent upon the shade and intensity of after-emission desired. The resulting end product comprises only zinc sulphide crystals having occluded in solid solution in the lattices thereof, minute quantities of both zinc oxide and the activator, the product being a fine powder, tan in color by daylight, strongly fluorescent with a bright blue color under ultra-violet excitation and having a phosphorescent after-glow of deep green for a considerable period.

In the second embodiment, I form my initial mixture by adding to 162.8 grams of zinc oxide a solution of copper chloride containing .018 gram of copper calculated as metal and from 2 to 5 grams of sodium chloride, dry and ignite for about forty-five minutes at temperatures between 500° C. and 700° C. to form as an intermediate product a complex zinc oxide crystal having occluded in the lattices thereof and in solid solution the activator and flux. I then cool and grind and mix therewith 96 grams or more of elemental sulphur and ignite for a period of a quarter of an hour to two hours between the temperatures of 1000° C. and 1350° C., dependent upon the shade and intensity of after-emission desired. The resulting end product comprises only zinc sulphide crystals having occluded in solid solution in the lattices thereof, minute quantities of both zinc oxide and the activator, the product being a fine powder, cream-white in color when viewed by daylight, strongly fluorescent with a strong green color under ultra-violet excitation and having a phosphorescent after-glow of strong green for a considerable period.

In this second embodiment, in lieu of using an alkali or alkaline earth salt as a flux, or any of the customary fluxes of the classic method, I may add to the zinc oxide-activator mix 15–20 cc. of a 37½% solution of hydrochloric acid. The acid reacts with the zinc oxide to form the corresponding zinc salt. As the preliminary ignition progresses, the zinc salt enters with the activator into a complex with the zinc oxide by adsorption or occlusion thereto. In the subsequent ignition with sulphur at elevated temperatures, the zinc salt acts as a flux. Alternatively, I may add as a flux one or more of the zinc salts of the above mentioned acids. We may designate such fluxes, produced by the reaction of acid with zinc oxide, or added as zinc salts to the reaction mix, self fluxes. A particular advantage in the use of self fluxes is the formation of exceedingly fine and uniform crystals in the resulting phosphor.

In the third embodiment, I mix 162.8 grams of zinc oxide with silver nitrate calculated as 0.01 gram of metal, 6 grams of lithium phosphate, and from 96 to 112 grams of sulphur. Ignition is then carried out at temperatures ranging from 1000° C. to 1350° C. for periods varying between one-quarter hour to 2.0 hours. In lieu of lithium phosphate, I may add an equivalent amount of phosphoric acid to the zinc oxide-activator mixture, then add the sulphur, dry and ignite in the above manner. The resulting end product comprises only zinc sulphide crystals having occluded in solid solution in the lattices thereof, minute quantities of both zinc oxide and the activator, the product being a fine powder, white in color when viewed by daylight, strongly fluorescent with a bright blue color under ultra-violet excitation and having a brief phosphorescent after-glow of a blue color.

In the fourth embodiment I intermix the luminescent zinc oxide containing in solid solution minute quantities of zinc oxide formed by igniting zinc oxide and sulphur in stoichiometric proportions as outlined in my previous application Serial Number 336,881, with for example, a solution of copper chloride containing .018 gram of copper calculated as metal and 2 to 5 grams of sodium chloride, dry, and ignite for a period of one-quarter to one-half hour at the temperature range of 1000° C. to 1350° C. The end product formed by this ignition comprises only luminescent zinc sulphide crystals having occluded in solid solution in the lattices thereof zinc oxide and the activator, the product being a fine powder, pale yellow in color when viewed under visible light, strongly fluorescent with a deep green color under ultra-violet excitation and having a phosphorescent after-glow of deep green for a considerable period.

Although I have indicated the specific use in the various embodiments of copper and silver as the cations of the activators, I may apply in lieu thereof activators wherein the cations may be other heavy metals; similarly, I may apply in lieu of sodium chloride or hydrochloric acid as fluxes, any member of the group of alkali or alkaline earth salts and any of the customary fluxes or any one of the acids of the group, hydrochloric, sulphuric, nitric or phosphoric acids.

I have found that the luminescent zinc sulphide end product of my invention, as compared to the luminescent product of the classic method, consists of very uniform and fine crystals, which have a greater stability to prolonged exposure under light, such as daylight or ultra-violet radiation.

In all of the embodiments or respective variations thereof as outlined, there is chemically formed at the ignition point and as the zinc oxide is being reduced by the elemental sulphur, a zinc sulphide crystal within the lattices of which there is physically embedded in solid solution zinc oxide and the metal cation of the activator, and since the intercombination and occlusion occurs in the crystals being formed at the ignition range from substantially stoichiometric amounts of zinc oxide and sulphur all of the end product consists of only luminescent zinc sulphide crystals.

It is obvious that various changes and modifications may be made to the details of this invention without departing from the general spirit thereof, as set forth in the appended claims.

I claim:

1. The process of producing a luminescent composition comprising igniting zinc oxide and sulphur in stoichiometric proportions together with minute quantities of a heavy metal activator at elevated temperatures, whereby as the chemical formation of the zinc sulphide crystals progresses, minute quantities of zinc oxide and the activator are simultaneously physically occluded in solid solution within the lattices of the crystals being formed.

2. The process of producing a luminescent composition comprising igniting zinc oxide and sulphur in stoichiometric proportions together with minute quantities of a heavy metal activator and a flux at a temperature between 1000° C. and 1350° C. and for at least one-quarter of an hour whereby there are formed, as an end product, crystals of zinc sulphide having occluded therein zinc oxide and the activator in solid solution.

3. In the method of forming a luminescent composition, the steps which comprise initially igniting zinc oxide with minute quantities of a heavy metal activator to form a zinc oxide complex incorporating the heavy metal activator occluded in solid solution, and thereafter igniting the zinc oxide complex with elemental sulphur at elevated temperatures to form as an end product, crystals of zinc sulphide having occluded therein zinc oxide and the activator in solid solution.

4. The process of producing a luminescent composition, comprising igniting zinc oxide with minute quantities of a heavy metal activator and a flux to form a zinc oxide complex, incorporating the heavy metal salt occluded in solid solution within the zinc oxide crystal, and thereafter igniting the zinc oxide complex with elemental sulphur at elevated temperatures to form as an end product, crystals of zinc sulphide having occluded therein zinc oxide and the activator in solid solution.

5. The process of enhancing the properties of luminescent crystals formed by igniting zinc oxide and sulphur in stoichiometric proportions, which comprises intermixing with such crystals minute quantities of a heavy metal activator and igniting at a temperature between 1000° C. and 1350° C. and for at least one-quarter of an hour whereby there are formed, as an end product, crystals of zinc sulphide having occluded therein zinc oxide and the activator in solid solution.

6. In a method of forming a luminous composition, the steps which consist in intermixing with zinc oxide an acid, sufficient to form a small amount of zinc salt of such acid, and adding thereto stoichiometric amounts of sulphur in relation to that of the zinc oxide and a minute quantity of a heavy metal activator, igniting the mixture between 1000° C. and 1350° C. for a period of at least one-quarter hour to form as an end product, a luminous zinc sulphide incorporating occluded zinc oxide and the heavy metal activator in solid solution.

7. In the formation of luminescent zinc sulphide by igniting zinc oxide and sulphur in the presence of small quantities of an activator, the step which consists of treating the zinc oxide prior to ignition with an acid of the group consisting of hydrochloric, sulphuric and phosphoric acid, to form at least a portion thereof into a zinc salt of the acid whereby the ignition mixture is self-fluxing.

8. The method of producing a luminescent composition which consists in adding to two mols of zinc oxide a minute quantity of a heavy metal activator and igniting the mixture at a temperature of 700° C. to 1000° C. for forty-five minutes to form as an intermediate product a zinc oxide complex, and thereafter adding to the intermediate product three mols of elemental sulphur and igniting the same at a temperature from 1000° C. to 1350° C. for at least a period of one-quarter of an hour, whereby there are formed, as an end product, crystals of zinc sulphide having occluded therein zinc oxide and the activator in solid solution.

9. The method of producing a luminescent composition which consists in adding to two mols of zinc oxide a minute quantity of a heavy metal activator and a flux and igniting the mixture at a temperature of 700° C. to 1000° C. for forty-five minutes to form as an intermediate product a zinc oxide complex, and thereafter adding to the intermediate product three mols of elemental sulphur and igniting the same at a temperature from 1000° C. to 1350° C. for at least a period of one-quarter of an hour whereby to form as an end product, crystals of zinc sulphide having occluded therein zinc oxide and the activator in solid solution.

10. A luminescent composition formed through ignition of zinc oxide and sulphur in the presence of minute quantities of a heavy metal salt, and consisting of only zinc sulphide crystals having occluded therein zinc oxide and a heavy metal in solid solution.

11. A luminescent composition formed through ignition of zinc oxide and sulphur in the presence of minute quantities of a heavy metal salt, and consisting of only zinc sulphide crystals having occluded therein zinc oxide and the heavy metal of the salt in solid solution.

12. A luminescent composition formed through ignition of a mixture of stoichiometric proportions of zinc oxide and sulphur and minute quantities of an activator, and consisting of only zinc sulphide crystals incorporating zinc oxide and the activator in solid solution.

MAC GOODMAN.